Aug. 31, 1926.
E. P. BONE
1,598,044
HEADLAMP
Original Filed Dec. 20, 1920
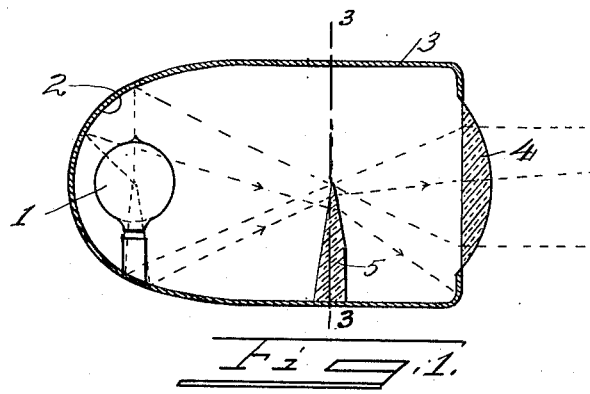
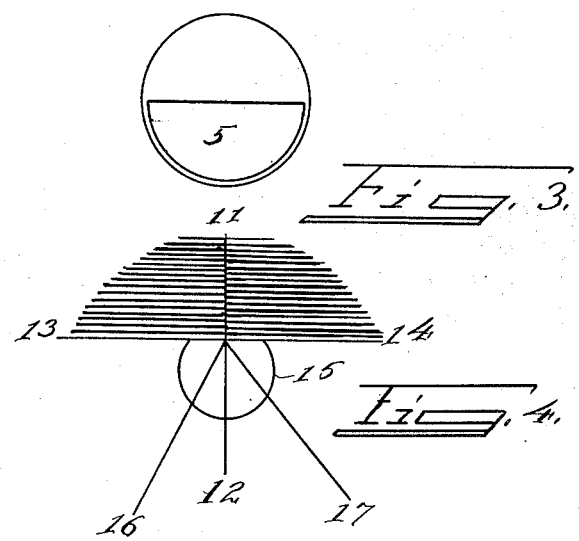
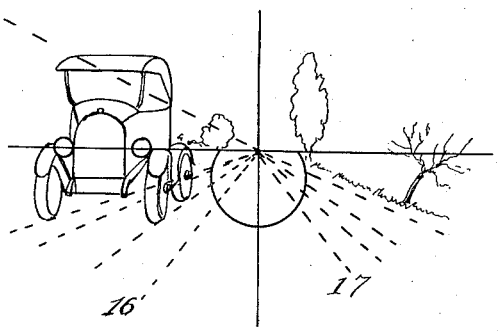
INVENTOR:
Evan P. Bone
BY Walter A. Knight.
ATTORNEY.

Patented Aug. 31, 1926.

1,598,044

UNITED STATES PATENT OFFICE.

EVAN P. BONE, OF CINCINNATI, OHIO.

HEADLAMP.

Original application filed December 20, 1920, Serial No. 432,018. Divided and this application filed April 23, 1923. Serial No. 634,011.

My invention relates to improvements in the light intercepting means of the type of lamp disclosed in my Letters Patent No. 1,389,291.

This is a divisional application from my pending application Serial No. 432,018, filed December 20, 1920. In my said patent, means are provided for applying the optical principle of real image projection for brilliantly illuminating the roadway at long range and at the same time preventing glare in the eyes of opposing drivers; the result being therein accomplished by the use of an opaque screen producing a sharply defined dark shadow.

The object of the present invention is to provide a transparent or translucent prismatic screen for increasing the certainty of adequately illuminating the road without causing glare, under varying road conditions; and is used where lighter shadows are desired than those produced by an opaque screen.

My invention is illustrated in the accompanying drawings in which:

Fig. 1, is a diagrammatic longitudinal axial sectional view of the headlamp of the character described showing the shape and location of the screen of the present invention and its relation to the field of illumination, Fig. 2, is a perspective view of the field of illumination as viewed from behind the lamp, Fig. 3, is a cross section through the lamp on the plane 3—3 of Fig. 1, and Fig. 4, is a diagram of the perspective view of the field of illumination as produced by the screen of Fig. 3.

Referring now to the drawings, the light radiating from the source 1, to the reflector 2, is thence directed through the plane 3—3 to the lens 4 and projected into the field of illumination. The plane 3—3 is the focal plane of the lens 4 and an image of whatever object is located in plane 9—10 is reproduced by the lens, in accordance with well known laws of optics.

An intercepting means consisting of a transparent or translucent screen 5, wedge shape in cross section, is located in the focal plane as shown and the rays are bent by the prism. If the screen is made of translucent glass or other translucent material of uniform translucency, the thinnest portion will cast the lightest shadow the thickest the darkest, etc. If the screen is made of transparent material, its efficiency is caused entirely by its capacity for diverting light rays initially directed toward the lens, so that they miss the lens. The prism may be shaped and proportioned as desired.

The object of the wedge shape is to obtain a thin edge along the cut-off line so as not to interfere with the rays passing the focal plane 3—3 at wide angles; and to refract part of the rays of light and prevent their passing through the lens.

Fig. 4 shows the shadow cast by the screen above the so called cut-off line 13—14. The effect of the screen upon the roadway is shown in Fig. 2, that is the whole lower part would be brilliantly illuminated, most brilliantly within the part enclosed in the arc, and the light on the upper portion above the horizontal line would be dimmed. If the screen was transparent the dimming would be less than if the screen was translucent, and if translucent the extent to which it was dimmed would depend upon the degree of translucency.

I claim as my invention and desire to secure by Letters Patent of the United States:

1. In combination with a headlamp having a source of light, a light concentrating reflector and a lens having its rearward principal focus within the headlamp, a non-opaque screen substantially in said rearward focal plane, said screen made wedge shaped to refract a part of the rays of light and prevent their passing thru the lens.

2. In combination with a headlamp having a source of light, a light concentrating reflector and a lens having its rearward principal focus within the headlamp, a screen substantially in said rearward focal plane and contiguous to said focus, said screen being transparent and having substantially a sharp edge at the top and wedge shaped in cross section to divert a part of the rays of light so as to prevent their passage thru the lens.

3. In a headlamp provided with a light concentrating reflector and a lens for projecting a real image, a glass screen disposed within the lamp between said reflector and lens and substantially in the focal plane of said lens, said screen being wedge shaped in its cross-section, and said wedge portion substantially contiguous to the area of greatest light concentration.

In testimony whereof I have hereunto set my hand.

EVAN P. BONE.